S. G. Randall
Grain Drill.

No. 3,464. Reissued May 25, 1869.

Witnesses.
Wm. H. Dickerson
Chas. F. Barton

Inventor.
Randall

N. PETERS, PHOTO-LITHOGRAPHER, WASHINGTON, D. C.

BEST AVAILABLE COPY

UNITED STATES PATENT OFFICE.

SILAS G. RANDALL, OF NEW BRAINTREE, MASSACHUSETTS.

IMPROVEMENT IN SEEDING-MACHINES.

Specification forming part of Letters Patent No. 25,443, dated September 13, 1859; Reissue No. 3,464, dated May 25, 1869.

*To all whom it may concern:*

Be it known that I, S. G. RANDALL, of New Braintree, in the county of Worcester and State of Massachusetts, have invented a new and Improved Seeding-Machine; and I do hereby declare that the following is a full, clear, and exact description of the same, reference being had to the annexed drawings, making a part of this specification, in which—

Figure 1:
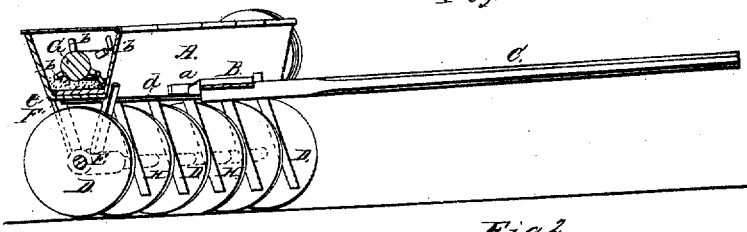
Figure 2:
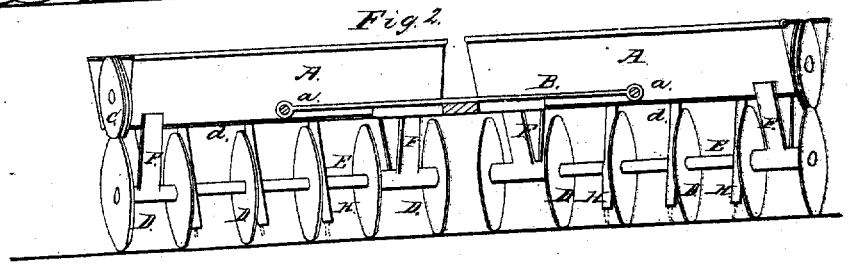
Figure 3:
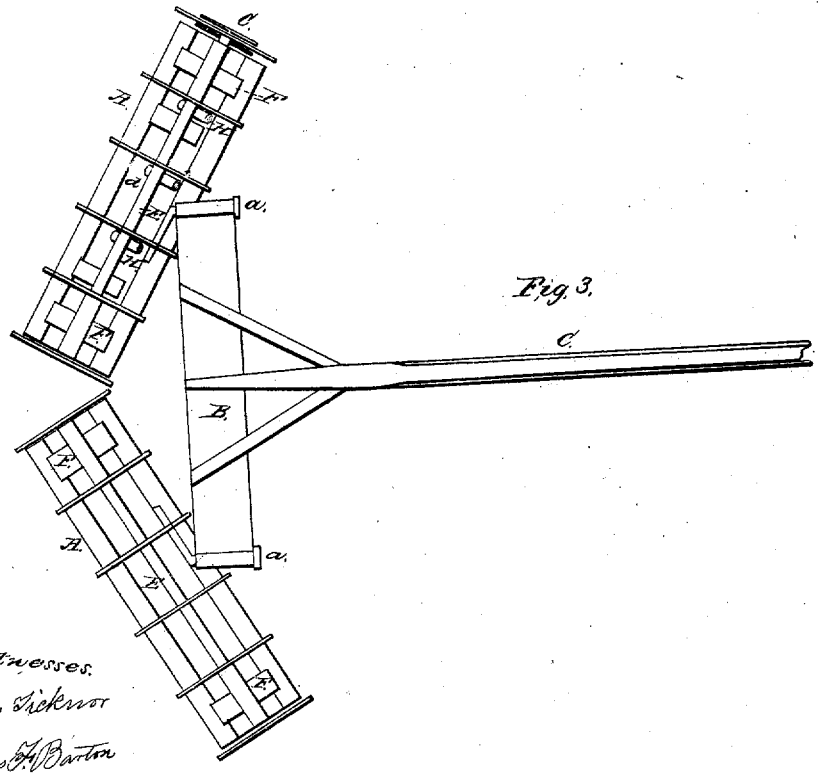

Figure 1 is a side sectional view of my invention. Fig. 2 is a front view of the same. Fig. 3 is an inverted plan of the same.

Similar letters of reference indicate corresponding parts in the several figures.

This invention consists in the employment or use of a novel harrowing device of my own invention, and the application of the same to and combined with a seed-box and seed-distributer, as hereinafter fully shown and described, whereby a very simple and efficient implement is obtained for harrowing and seeding combined, or for harrowing alone, if desired. This implement may be used on rough ground without being obstructed in its work or liable to be broken or injured.

To enable those skilled in the art to fully understand and construct my invention, I will proceed to describe it.

A A represent two seed-boxes, which may be of oblong quadrilateral taper form, and connected by swivel-joints *a a* to the ends of a plate or bar, B, to the center of which the draft-pole C is attached. The seed-boxes, it will be seen, have an oblique position relatively with each other, as clearly shown in Fig. 3. Each seed-box A is mounted on a series of plate-wheels, D, which are placed upon axles E. The seed-boxes are attached to their axles by proper supports, F, which are sufficiently high to allow the wheels D to work under them, as clearly shown in Figs. 1 and 2. In each seed-box A a longitudinal shaft, G, is placed, said shaft being provided with radial arms *b*, as shown clearly in Fig. 1. The outer journal of each shaft G extends through the end of its seed-box, and a pulley, C, is placed thereon. These pulleys may be provided with grooved peripheries, into which the outermost wheel, of each series is fitted, and rotate the shafts by friction only. Any other similar means, however, may be employed for rotating these shafts from the axles E. The bottoms of the seed-boxes A are perforated, as usual, and when the device is intended to be used as a broadcast seeding-machine the seed is discharged through the perforated bottoms by the rotation of the shafts G, the arms *b* acting as agitators to prevent the choking or clogging of the seed in the boxes and insure its even distribution. In case the device is to be used as a drill a plate, *d*, is fitted underneath each seed-box A. These plates have seed-ducts or conveying-tubes H attached, which communicate with the seed-boxes and convey the seed therefrom into drills.

From the foregoing description it will be seen that the axles E E of the plate-wheels D have an oblique position to the line of draft, and consequently as the machine is drawn along each wheel D performs the function of a plow and the series of wheels operate as a gang-plow, but making comparatively small furrows, so as to cover the seed far more effectually than by any of the ordinary harrows or common seed-covering devices that have come under my observation. The plate-wheels D therefore perform two functions—that of wheels for the mounting of the seed-boxes and of rotating shares or coverers for covering the seed. Each seed-box, with its wheels, is allowed to rise and fall independently of the other, so as to conform to the inequalities of the ground. The wheels D are far superior to the harrow or shares ordinarily used for covering seed, as the latter are greatly obstructed in rough ground by roots, weeds, and the like; but the wheels D pass over such obstructions or will cut their way through them, so that they can form no impediment to their progress. The implement also, as a whole, is rendered very compact, and it may be constructed at a very reasonable cost.

The use of a single shaft in each set passing the centers of the wheels D can only be available when the harrowers are desired and constructed at an obtuse angle obliquely to the line of draft, as shown in the drawings. Should, however, it be deemed desirable to construct the harrowers at an acute angle obliquely to the line of draft, the wheels D would of course be set upon separate axles or studs to accomplish the same result by embracing the practical features of my invention.

I do not claim the rotating armed shafts G

BEST AVAILABLE COPY in the seed-boxes A A, for they have been previously used and are common to many seeding-machines; but I do claim as new and desire to secure by Letters Patent—

1. The harrowing plate-wheels D, revolving upon axes oblique to the line of draft, arranged in series and inversely duplicated, substantially as shown and described, for the purposes specified.

2. The arrangement and combination of the series of plate-wheels D D, seed-boxes A, and horizontal bar B, substantially as herein described and shown, so that as the bar B is drawn along the plate-wheels shall assume an oblique position, as set forth.

SILAS G. RANDALL.

Witnesses:

FRED C. NORTON,

MILO B. RANDALL.